April 10, 1928.
C. S. HUMPHREY
1,666,012
COOKING, FREEZING, AND STORING RECEPTACLE
Filed Jan. 24, 1927
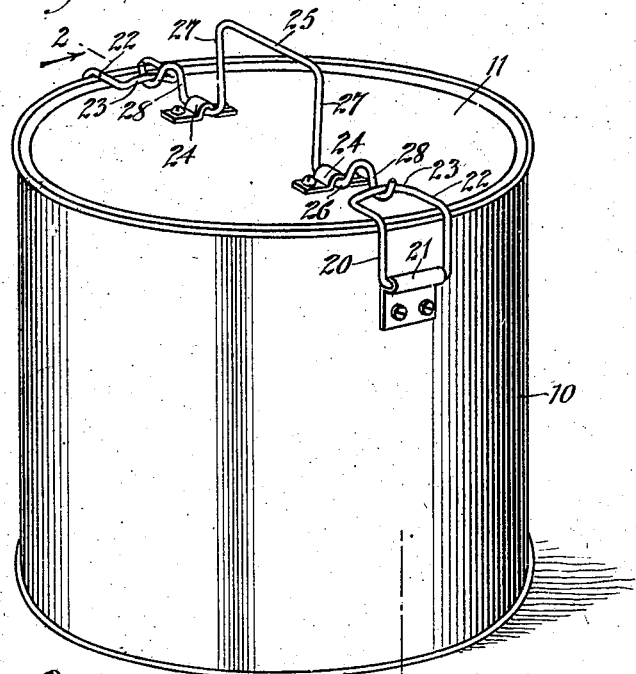
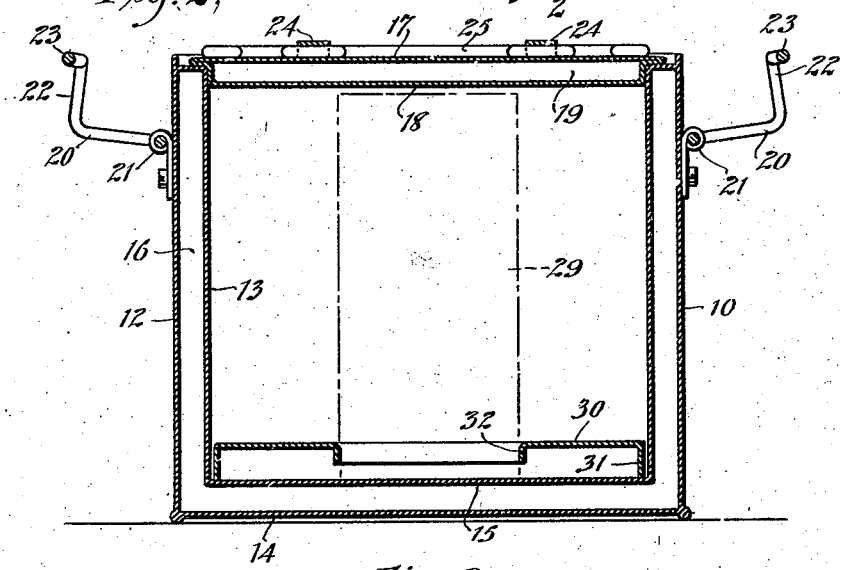
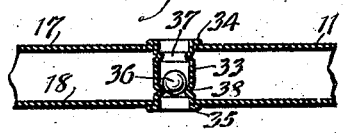
WITNESSES
Edw. Thorpe
Hugh H. ...
INVENTOR
Clen S. Humphrey
BY
ATTORNEY Patented Apr. 10, 1928.

1,666,012

UNITED STATES PATENT OFFICE.

CLEN S. HUMPHREY, OF BROOKLYN, NEW YORK.

COOKING, FREEZING, AND STORING RECEPTACLE.

Application filed January 24, 1927. Serial No. 163,258.

This invention relates to receptacles or containers and refers particularly, although not exclusively, to the type which is provided with a dead air or vacuum space in the walls of the body and cover whereby the same may be employed as a cooking or freezing utensil or as a receptacle for storing hot or cold substances to maintain the same at approximately the same temperature for a protracted period of time.

The invention primarily comprehends a receptacle or container including a body and a cover provided respectively, with handles which are interengaged to set up a locking connection between the cover and body, and also to constitute a means for sealing the cover with respect to the body whereby the complete receptacle may be lifted and carried by the cover handle.

As a further object the invention comprehends cover and body handles which may be disposed in a position which will allow for a close nesting or packing of a plurality of receptacles for the purpose of storage or shipment.

As a further object the invention comprehends a centering device adapted to be positioned within the receptacle body for the purpose of receiving and supporting a second container or receptacle within the body of the device.

The invention furthermore contemplates a pressure actuated valve formed in the receptacle cover, which permits of the escape of excess pressure developed within the receptacle especially when used for cooking purposes.

Other objects of the invention reside in the simplicity of construction of the device, the economy with which the same may be produced, and the general efficiency derived therefrom.

With the above and other objects in view, reference is had to the following specification and accompanying drawings in which there is exhibited one example or embodiment of the invention which is in no way intended as a limitation upon the scope of the appended claim as it is to be clearly understood that variations and modifications which properly fall within the scope of said claim may be resorted to when found expedient.

In the drawings—

Figure 1 is a perspective view of the receptacle or container with the cover applied and in its locked and sealed condition;

Fig. 2 is a vertical sectional view therethrough taken approximately on the line 2—2 of Fig. 1, illustrating the cover and body connecting means disengaged;

Fig. 3 is a fragmentary sectional view through the cover illustrating the pressure valve.

Referring to the drawings by characters of reference, the receptacle includes a body 10 and a cover 11, the body being provided with double outer and inner spaced side walls 12 and 13 and double outer and inner spaced bottom walls 14 and 15, to define a dead air or vacuum space 16. The cover 11 is provided with outer and inner spaced walls 17 and 18 defining a dead air or vacuum space 19 and the cover is preferably designed to frictionally fit within the upper open end of the receptacle body 10. In order to provide means for locking the body and cover 10 in closed relation, to afford means for effectually sealing the same in closed relation and to provide handles for the cover and body, a pair of bail-like handle elements 20—20 are pivoted to the outer sides of the body at diametrically opposite points adjacent the upper open end by means of bearings 21. The bail-like handle members 20 are formed with angularly bent portions 22, having substantially arcuate bights 23, which angularly bent portions are adapted to be swung to a position, as illustrated in Fig. 1, to overlie the upper end of the body 10 and a portion of the cover 11. The cover 11 has swingingly mounted in bearings 24 on its upper surface a substantially inverted handle 25, the outturned extremities 26 of the legs 27 of which are journaled in the bearings 24 to allow for a swinging movement of the handle from a position in a plane parallel with the upper surface of the cover to a plane at right angles to the plane of the surface of the cover, which positions are respectively illustrated in Figs. 1 and 2. The extremities 26 extend outwardly beyond the bearings 24 and are bent to form substantially S-shaped terminals 28, which are adapted to interlock or interengage with the arcuate bights 23 when the handle is raised or projected upwardly whereby to effect and maintain a sealing connection between the cover 11 and the body 10. This also allows the cover handle 25 to be used as a means for lifting and carrying the complete receptacle with its contents. To release and disengage the S-shaped terminals 28, the handle 25 is swung downwardly to occupy a plane parallel to the plane of the upper surface of the cover 11 or to the position illustrated in Fig. 2; the body handles 20 being then free for outward swinging movement to the position shown in Fig. 2. The handle 25 may then be swung upwardly to serve as means for unsealing and removing the cover from the body while the handles 20—20 may be used for lifting and carrying the body of the receptacle with the cover removed.

Where the device is used for the purpose of freezing substances, it is preferable to provide means for supporting an inner receptacle, indicated at 29 in broken lines in Fig. 2, in a central position so that ice or other freezing medium may be evenly distributed around the receptacle 29. To accomplish this, a spacing element 30 is employed which is in the nature of an annular member having a relatively wide depending outer flange 31 and a relatively narrow depending inner flange 32, the outer diameter of which device is slightly less than the internal diameter of the receptacle body 10 and the inner diameter of which is of a size to snugly receive the receptacle 29. By constructing the inner flange 32 of a narrower width than the outer flange 31, the user may insert his fingers through the central opening and engage them under the lower edge of the flange 32 to effect the removal of the spacing element.

Where the device is to be employed in the capacity of a cooking utensil, or in any capacity where an internal pressure is developed, some means must of necessity be provided to relieve the internal pressure before it reaches a dangerous degree, and for this reason there is illustrated in Fig. 3, a relief valve which consists of a tubing section 33 extending through the cover 11 and flanged at 34 and 35 at its upper and lower ends over the outer and inner walls 17 and 18 of the cover. A ball valve 36 is arranged in the tubing and is of slightly less diameter than the tubing. The tubing is formed with upper and lower annular constricted beads 37 and 38, and the ball valve 36 normally seats on the lower bead to close the vent by gravity but is allowed a limited upward movement by the internal pressure within the receptacle, the upward movement being limited by the upper bead 37.

What is claimed is:

A receptacle, including a body and a friction cover, a pair of bail-like handles pivoted at diametrically opposite points to the sides of the body, said handles having angularly bent bight portions adapted to be disposed over the upper end of the body and over a portion of the cover, and a handle swingably carried by the cover having portions adapted for interengagement with the angularly bent portions of the body handles when swung to an upright position, for locking the cover to the body and effecting a sealing of the cover with the body.

CLEN S. HUMPHREY.